(12) United States Patent
Bottazzi et al.

(10) Patent No.: US 10,448,203 B2
(45) Date of Patent: Oct. 15, 2019

(54) HIGH ACCURACY INDOOR LOCATING SYSTEM

(71) Applicant: Datalogic IP Tech S.R.L., Calderara di Reno, Bologna (IT)

(72) Inventors: Marco Bottazzi, Bologna (IT); Enrico Savioli, Bologna (IT); Federico Natali, Bologna (IT)

(73) Assignee: Datalogic IP Tech S.R.L., Calderara di Reno, Bologna (IT)

( * ) Notice: Subject to any disclaimer, the term of this patent is extended or adjusted under 35 U.S.C. 154(b) by 0 days.

(21) Appl. No.: 15/406,410

(22) Filed: Jan. 13, 2017

(65) Prior Publication Data

US 2017/0134902 A1 May 11, 2017

Related U.S. Application Data

(62) Division of application No. 14/682,942, filed on Apr. 9, 2015, now Pat. No. 9,571,985.

(51) Int. Cl.
*H04B 1/69* (2011.01)
*H04W 4/02* (2018.01)
(Continued)

(52) U.S. Cl.
CPC ............. *H04W 4/023* (2013.01); *G01S 1/042* (2013.01); *H04B 1/69* (2013.01); *H04B 17/318* (2015.01);
(Continued)

(58) Field of Classification Search
CPC ........ H04B 1/69; G01S 11/02; H04M 1/7253; H04M 2250/02
(Continued)

(56) References Cited

U.S. PATENT DOCUMENTS

2003/0013146 A1 1/2003 Werb
2007/0021065 A1 1/2007 Sengupta et al.
(Continued)

FOREIGN PATENT DOCUMENTS

WO 2007023446 A1 3/2007

OTHER PUBLICATIONS

Fontana, Robert J., "Recent System Applications of Short-Pulse Ultra-Wideband (UWB) Technology," IEEE Transactions on Microwave Theory and Techniques, vol. 52, No. 9, Sep. 2004, pp. 2087-2104.
(Continued)

*Primary Examiner* — Chieh M Fan
*Assistant Examiner* — Fitwi Y Hailegiorgis
(74) *Attorney, Agent, or Firm* — Dentons US LLP

(57) ABSTRACT

A beacon anchor may include a signal generator configured to generate an ultra-wide band signal inclusive of a unique identifier associated with the beacon anchor, where the UWB signal is a pulse sequence. A transceiver may be in communications with the signal generator. Responsive to receiving the UWB signal from the signal generator, the UWB signal may be broadcast. A processing unit may be in communication with the transceiver, and, responsive to receiving a unicast communications session request from a portable device, be configured to establish a unicast communications session with the portable device to enable a distance between the portable device and beacon anchor to be determined. Through use of UWB signals, relative position (e.g., in front of or behind the beacon anchor) may be determined, thereby enabling different actions to be taken in response to determining the relative position.

19 Claims, 4 Drawing Sheets

(51) Int. Cl.
- H04W 4/04 (2009.01)
- G01S 1/04 (2006.01)
- H04W 4/80 (2018.01)
- H04W 4/021 (2018.01)
- H04B 17/318 (2015.01)
- H04H 20/38 (2008.01)
- H04M 1/02 (2006.01)
- H04W 40/24 (2009.01)

(52) U.S. Cl.
CPC .......... *H04H 20/38* (2013.01); *H04M 1/0202* (2013.01); *H04W 4/021* (2013.01); *H04W 4/04* (2013.01); *H04W 4/043* (2013.01); *H04W 4/80* (2018.02); *H04W 40/244* (2013.01)

(58) Field of Classification Search
USPC ................. 375/130; 455/41.2; 342/458, 451; 340/573.4
See application file for complete search history.

(56) References Cited

U.S. PATENT DOCUMENTS

| | | |
|---|---|---|
| 2007/0178837 A1 | 8/2007 | Koike |
| 2009/0079580 A1 | 3/2009 | Kaplan et al. |
| 2011/0205125 A1* | 8/2011 | Lin ........................ G01S 5/0036 342/451 |
| 2012/0050048 A1* | 3/2012 | Sandra .................... G01S 19/17 340/573.4 |
| 2013/0217332 A1 | 8/2013 | Altman et al. |
| 2014/0277654 A1 | 9/2014 | Reinhardt et al. |
| 2015/0050944 A1 | 2/2015 | Ekbatani et al. |
| 2015/0104152 A1 | 4/2015 | Reinhardt et al. |
| 2016/0047887 A1 | 2/2016 | Niewczas et al. |

OTHER PUBLICATIONS

Liu, Hui, "Survey of Wireless Indoor Positioning Techniques and Systems," IEEE Transactions on Systems, Man, and Cybernetics—Part C: Applications and Reviews, vol. 37, No. 6, Nov. 2007, pp. 1067-1080.

Steiner, Christoph, "Location Fingerprinting for Ultra-Wideband Systems, The Key to Efficient and Robust Localization," A dissertation submitted to the ETH Zurich, Dipl.-Ing., Graz University of Technology, Dec. 31, 2010, pp. 1-179.

European Search Report for Application No. 16164400.0 dated Jun. 15, 2016, 9 pages.

Lanzisera, Steven, et al., "Radio Frequency Time-of-Flight Distance Measurement for Low-Cost Wireless Sensor Localization," IEEE Sensors Journal, vol. 11, No. 3, Mar. 2011, pp. 837-845.

European Office Action corresponding to EP16164400.0, dated May 25, 2018, 4 pages.

* cited by examiner

HIGH ACCURACY INDOOR LOCATING SYSTEM

RELATED APPLICATIONS

This Application is a divisional of co-pending U.S. application Ser. No. 14/682,942, filed Apr. 9, 2015, entitled HIGH ACCURACY INDOOR LOCATING SYSTEM, the contents of which are hereby incorporated by reference in their entirety.

BACKGROUND

Retail stores have incorporated beacon technology into stores in recent years in order to communicate with customers in ways previously not possible. Through use of beaconing technology, localized promotional advertising to customers within the retail stores is possible. For example, a retailer who wants to promote children's shoes to shoppers near a shoe section of a retail store can broadcast a promotional message to portable devices, such as smartphones, of shoppers when the shoppers come within a certain range of a fixed-position broadcast beacon or beacon anchor. One example of beacon technology is the iBeacon™ produced by Apple Inc.

Currently, technology used for beaconing is implemented using Bluetooth® low-energy (BLE) devices and protocol stacks. The BLE devices and protocol stacks have several drawbacks, including ranging data being based only on a received signal strength indication (RSSI) measurement that has low stability and is severely affected by the environment, "clutter" (or unwanted echo signals), and other noise-producing parameters, which results in range measurement inaccuracy. The RSSI measurement is used to determine a distance zone at which a portable device is located from the beacon, where the zones are defined as immediate (a few centimeters), near (a few meters), and far (approximately 10 meters).

As a result of RSSI having low stability, a condition in which "hot zone" indications are unstable and lead to false positives or alarms is created. The RSSI measurement is critical because signal strength decreases rapidly. As understood in the art, signal strength decreases with a square of the distance, and, in this case, between the beacon anchor and mobile device. Moreover, the presence of structures and otherwise, such as shelves, floor, people walking within a field of an antenna, and other items in stores and other indoor environments, creates "clutter" or echo signals, which makes it even more difficult to distinguish a primary beacon signal from signal bounces and reflections that affect the primary BLE beacon signal. Such alteration in signal strength reduces accuracy of location estimates as the RSSI measurement is generally lower as a result of the "clutter," and, thus, the beacon anchor appears to be farther from a portable device measuring the signal strength.

Another problem that results from the use of BLE devices within retail stores is the inability to determine relative position of a portable device from a beacon anchor. Antennas used with BLE devices typically broadcast a generally symmetric antenna pattern around the beacon anchor, which means that a portable device that measures the beacon signal in front of the beacon anchor typically has the same RSSI measurement as a portable device that measures the beacon signal behind the beacon anchor. As a result, false positives result when a portable device is behind the beacon anchor.

Accordingly, there is a need to improve accuracy and to reduce false alarms for indoor locating systems.

SUMMARY

To address the shortcomings of conventional indoor beacons that use Bluetooth® low-energy (BLE) technology in terms of distance accuracy and relative positioning (e.g., front and back of beacon) that results in false positives, ultra wide band (UWB) radio frequency technology may be used by UWB beacon anchors. As UWB signaling has a very wide bandwidth (e.g., greater than 500 MHz), distance measurement resolutions of 1 ns or less may be achieved. Moreover, UWB also provides for using "clutter" as a signature for "fingerprinting" a signal from a beacon anchor using UWB received by a portable device (e.g., smartphone) to determine relative position (i.e., in front of/behind the shelf) of the portable device with respect to the UWB beacon anchor. Responsive to the portable device detecting the UWB beacon signal (e.g., periodic broadcast frame with a unique identifier of the beacon anchor), the portable device may initiate a unicast communication with the beacon anchor using UWB signals to enable the portable device to determine range or distance between the UWB beacon anchor and portable device. If a determination is made by the portable device that the portable device and beacon anchor are within a certain distance (e.g., 15 feet), communications between the portable device and a promotional marketing server may be established by the portable device communicating the unique identifier of the beacon anchor so that the server may communicate promotional marketing or other information to the portable device that is related to an area or products locally positioned to the UWB beacon anchor.

One embodiment of a beacon anchor may include a signal generator configured to generate an ultra-wide band signal inclusive of a unique identifier associated with the UWB beacon anchor, where the UWB signal is a pulse sequence. A transceiver may be in communications with the signal generator. Responsive to receiving the UWB signal from the signal generator, the UWB signal may be broadcast from the transceiver. A processing unit may be in communication with the transceiver, and, responsive to receiving a unicast communications session request from a portable device, be configured to establish a unicast communications session with the portable device to enable a distance between the portable device and beacon anchor to be determined.

One embodiment of a method of forming an indoor locating system may include positioning at least one UWB beacon anchor within an indoor environment. The UWB beacon anchor(s) being configured to broadcast an ultra-wide band (UWB) beacon signal including a unique identifier associated with the respective UWB beacon anchor(s). The UWB beacon signal may be a pulse sequence. The UWB beacon anchor(s) may further be configured to establish a unicast communications session with a portable device in communicative proximity to a UWB beacon anchor to enable the portable device to determine the distance from the UWB beacon anchor.

One embodiment of a method for providing messaging to a user of a portable device in an indoor environment may include receiving, by the portable device, an ultra-wide band signal from a UWB beacon anchor within the indoor environment. The UWB signal may be a pulse sequence and include a unique identifier associated with the UWB beacon anchor. The portable device may establish a unicast UWB communications session with the UWB beacon anchor. The portable device may generate and communicate a timing signal to the UWB beacon anchor during the unicast UWB communications session. A response to the timing signal from the UWB beacon anchor may be received by the portable device. Time-of-flight of the timing signal between the portable device and the UWB beacon anchor may be determined by the portable device, and distance of the portable device to the UWB beacon anchor may be computed by the portable device based on the determined time-of-flight of the timing signal. In response to a determination that the portable device is within a certain distance of the UWB beacon anchor, a query communication inclusive of a unique identifier associated with the UWB beacon anchor may be initiated via a communications network to a server to notify the server that the portable device is within the certain distance of the UWB beacon anchor to enable the server to communicate a message associated with the unique identifier associated with the UWB beacon anchor to the portable device.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
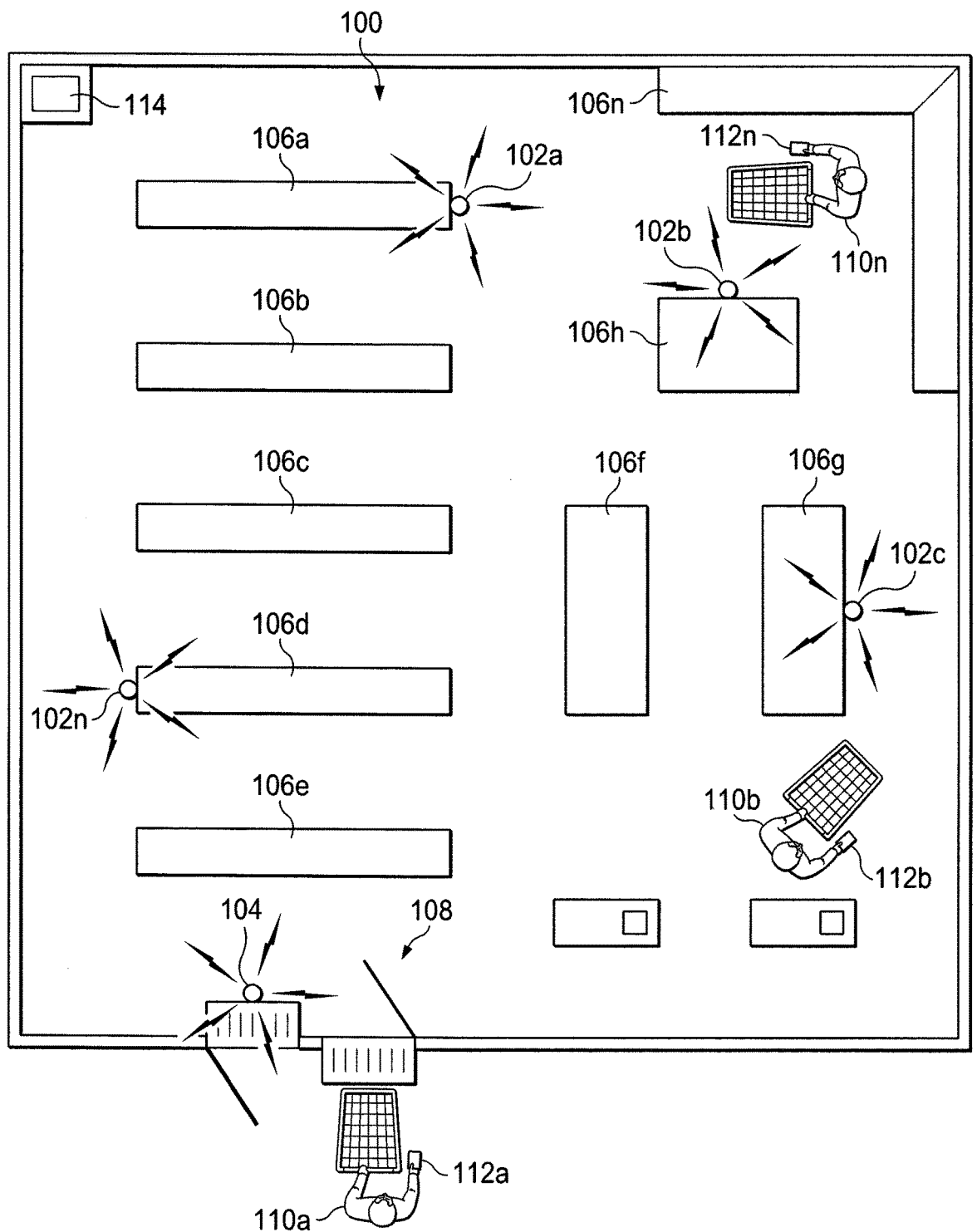
FIG. 1 is an illustration of an illustrative indoor environment, in this case a retail store, in which UWB beacon anchors are positioned.

With regard to FIG. 1, an illustration of an illustrative indoor environment 100, in this case a retail store, in which UWB beacon anchors are positioned, is shown. The indoor environment 100 is shown to include multiple UWB beacon anchors 102a-102n (collectively 102) positioned within the indoor environment 100. The UWB beacon anchors 102 may be fixedly positioned in the indoor environment 100, including mounting the UWB beacon anchors 102 on fixtures, shelves, ceilings, or other locations within the indoor environment 100. The UWB beacon anchors 102 are configured to communicate using an ultra-wide bandwidth (e.g., over 500 MHz) that provides high resolution (e.g., 1.3 cm for a signal bandwidth of 500 MHz). UWB signals may be pulse sequences, and the UWB beacon anchors are configured to send a broadcast frame that includes a unique identifier. In one embodiment, the unique identifier may utilize the same data format as conventional beacon anchors that include (i) a universally unique identifier (UUID) that is formed of a 16-byte string that distinguishes a company's beacons from others, (ii) a major value that is formed of a 2-byte string used to specify a beacon within a group (e.g., particular group or region of stores), and (iii) minor value that is formed of a 2-byte string used to identify specific beacons (e.g., section within a store).

As the indoor environment 100 is a retail store, gondolas or shelves 106a-106n (collectively 106) are positioned throughout the store. As understood in the art, the shelves 106, floor, fixtures (e.g., poles), products, people, and other items within the indoor environment 100 result in "clutter" of communications signals, especially those being measured using signal strength (e.g., RSSI measurements) to perform distance measurements. However, as a result of using UWB signals, such "clutter" causing items have minimal or no impact in distance measurements. Because UWB signals have secondary peaks or sidelobes, as understood in the art, and are measurable using UWB receiving devices, those secondary peaks can be used as "fingerprints" to identify the relative positioning of a receiving device of a portable device relative to each of the respective UWB beacon anchors 102.

In one embodiment, wireless access point (WAP) 104 may be utilized to provide local wireless communications within the indoor environment 100. It should be understood multiple WAPs may be utilized within the indoor environment, and that the WAPs may communicate with portable devices of users anywhere inside and/or outside the indoor location 100. As shown, the wireless access point 104 may be placed in communicative proximate location to an entryway 108 such that the wireless access point 104 may communicate with users 110a-110n (collectively 110) with portable devices 112a-112n (collectively 112) as the users 110, in this case shoppers, enter via the entryway 108 or elsewhere outside or throughout the indoor environment. The portable devices 112 may be any portable electronic device configured with UWB signaling or equivalent capabilities along with data communications capabilities over local and/or mobile communications networks. Such portable electronic devices may include mobile telephones, Datalogic Joya™ pods (a self-shopping tool for shoppers to scan products while shopping to expedite checkout), or any other electronic devices having the capabilities described hereinabove.

In an aspect, a server 114 located within the indoor environment 100, may be configured to be in communication with the wireless access point 104 to enable communication of "fingerprints" or "signatures" associated with respective UWB beacon anchors 102 to the portable devices 112. In an alternative embodiment, the server 114 may be located on a communications network and physically located remotely from the indoor environment 100. The "fingerprints" may be used by the portable devices 112 to avoid the problem of determining whether the portable devices 112 are in the front and back side, for example, of the UWB beacon anchors 102. Each of the UWB beacon anchors typically has a different signature due to producing different "clutter" signal measurements as a result of different objects (e.g., shelves) being positioned near the respective UWB beacon anchors or due to transmitters and/or antennas of the UWB beacon anchors producing slightly different signals. In being positioned near the UWB beacon anchors, objects within an antenna pattern of the UWB beacon anchors may cause "clutter."

Figure 2:
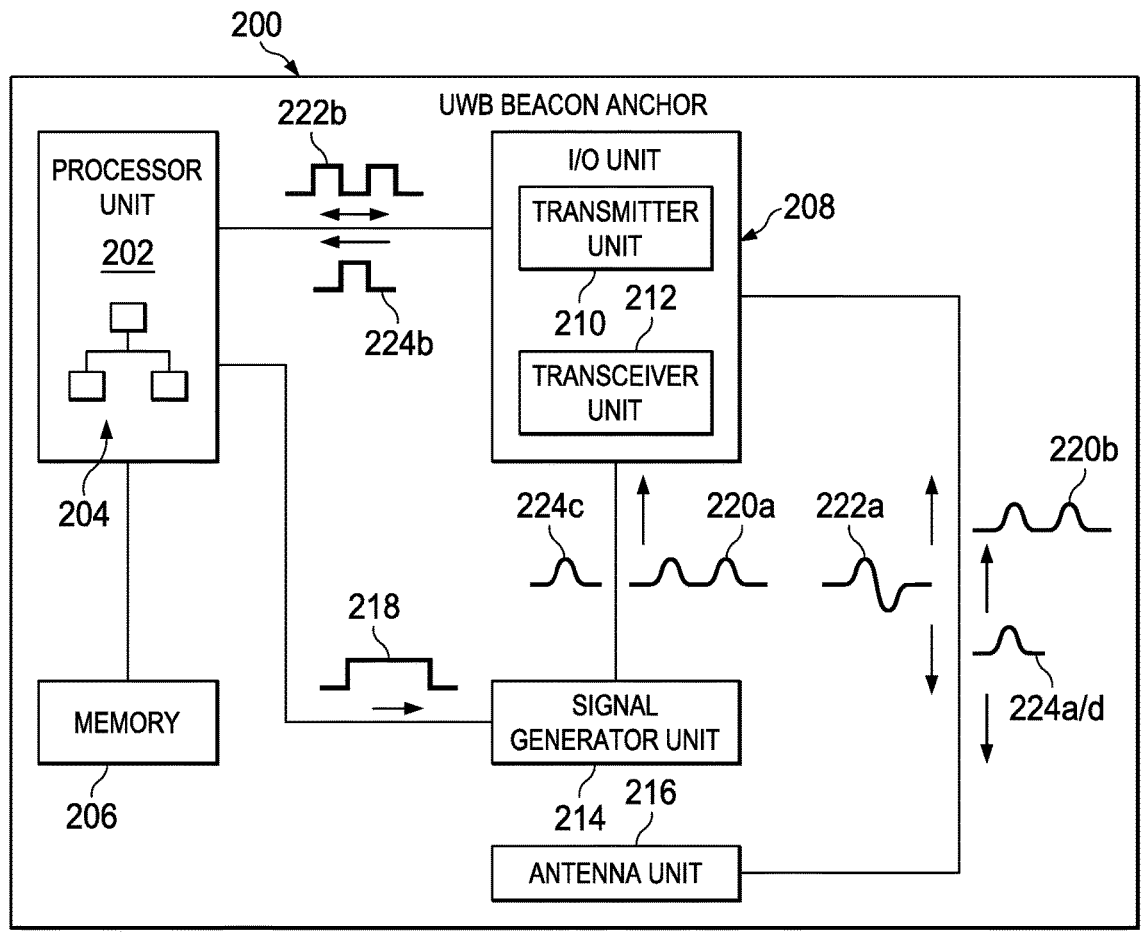
FIG. 2 is a block diagram of an illustrative UWB beacon anchor for use in an indoor environment.

With regard to FIG. 2, a block diagram of an illustrative UWB beacon anchor 200 for use in an indoor environment is shown. The UWB beacon anchor 200 may include a processing unit 202, which may include one or more computer processors, configured to execute software 204. The processing unit 202 may be in communication with (i) a memory 206, which may be configured to store data and/or software, (ii) an input/output (I/O) unit 208 that may include a UWB transmitter unit 210 and/or transceiver unit 212, and (iii) a signal generator unit 214. The transmitter unit 210 may be configured to transmit and receive UWB signals and the transceiver unit 212 may be configured to transmit and receive signals such as WiFi® communications signals or other communications signals. The I/O unit 208 may be in communication with an antenna unit 216 that may include one or more antennas configured to transmit and receive signals at UWB frequencies and, optionally, other frequencies depending upon the configuration of the UWB beacon anchor 200. It should be understood that the transmitter unit 210 may alternatively be a transceiver unit.

In operation, the processing unit 202 may communicate a signal, such as a digital signal, to the signal generator unit 214 to generate an analog frequency signal for transmission via the I/O unit 208. In one embodiment, the signal 218 may include a broadcast frame inclusive of the unique identifier associated with the UWB beacon anchor 200 or a timing signal that matches and/or is in response to receiving a timing signal from a portable device so as to enable the portable device to determine distance from the UWB beacon anchor 200. Latency of the UWB beacon anchor 200, as further described herein, may also be utilized in computing distance in a more accurate manner.

In the event that the signal 218 is a broadcast frame, then the signal generator unit 214 may generate a UWB beacon signal 220a that includes a pulse sequence inclusive of the broadcast frame with the unique identifier, and the UWB beacon signal 220b may be generated inclusive of the unique identifier so that portable devices within a communication proximity of the UWB beacon anchor 200 may identify that the UWB beacon anchor 200 exists, In one embodiment, the UWB beacon signal 220a may be processed via the transmitter unit 210 to produce a UWB beacon signal 220b and communicate via the antenna unit 216 inclusive of an antenna configured to broadcast UWB signals externally from the UWB beacon anchor 200.

In response to a portable device (not shown) identifying that the UWB beacon anchor 200 exists in response to receiving the UWB beacon signal 220b, the portable device may communicate a unicast session request signal 222a to request a unicast session with the UWB beacon anchor 200. The unicast session request signal 222a may be processed via the transceiver unit 212 and communicated to the processing unit 202 as a digital UWB request signal 222b to initiate a unicast communication session between the UWB beacon anchor 200 and the portable device.

During a unicast communication session, the portable device communicates a timing signal 224a that the UWB beacon anchor 200 receives and responds back to the portable device. In that regard, the transceiver unit 212 may release and convert the timing signal 224a to a digital timing signal 224b for processing by the processing unit 202. In response, the processing unit 202 may generate a signal 218 to cause the signal generator unit 214 to produce UWB timing signal 224c for the transceiver unit 212 (or transmitter unit 210) to broadcast UWB timing signal 224d back to the portable device.

The UWB timing signal 224d may be used to enable the portable device to accurately determine distance from the UWB beacon anchor 200. In one embodiment, the UWB timing signal 218 may include the broadcast frame in the same manner as the UWB beacon signal 220a. Alternatively and/or additionally, the UWB timing signal 218 may include a timing indicator (e.g., clock time, pulse sequence, or other timing signal) received from the portable device, that enables the portable device to determine round trip of the UWB timing signal 224a produced by the portable device. The UWB timing signals 222a and 224a/d are shown to travel bi-directionally through the UWB beacon anchor 200, as the UWB beacon anchor 200 operates to receive and respond to an incoming UWB request signal 222a from the portable device and an incoming UWB timing signal 224a. It should be understood that rather than the processing unit 202 being configured to receive and process the UWB timing signal 224b that the signal generator unit 214 may alternatively be configured to perform the function of receiving and processing the timing signal. It should further be understood that various functions performed by the processing unit 202 may alternatively be integrated into the signal generator unit 214.

Figure 3:
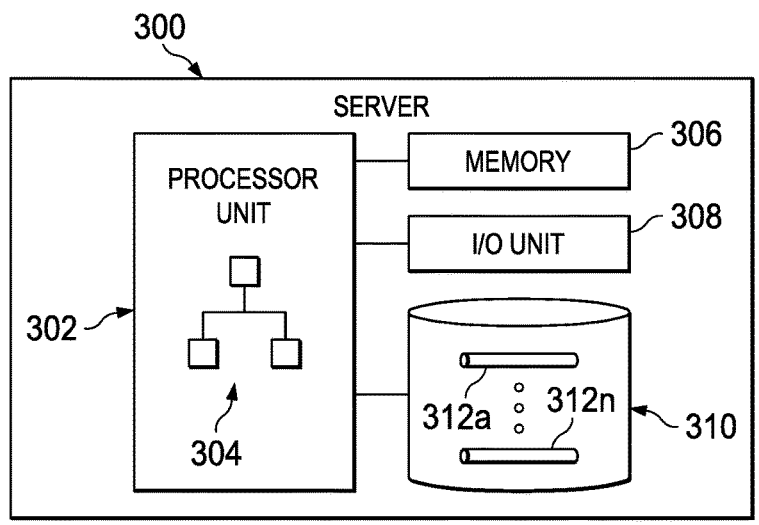
FIG. 3 is a block diagram of an illustrative server for use in providing information to users in cooperation with UWB beacon anchors communicating unique identifiers associated with respective UWB beacon anchors within an indoor environment.

With regard to FIG. 3, a block diagram of an illustrative server 300 for use in providing information to users in cooperation with UWB beacon anchors communicating unique identifiers associated with respective UWB beacon anchors within an indoor environment is shown. The server 300 may include a processing unit 302 composed of one or more computer processors that executes software 304. The processing unit 302 may be in communication with (i) memory 306 configured to store data and/or software, (ii) input/output (I/O) unit 308 configured to communicate over a communications network, such as a local area network (LAN) and/or wide area network (WAN), such as the Internet, and (iii) storage unit 310 configured to store one or more data repositories 312a-312n (collectively 312). In one embodiment, the data repositories 312 may be configured to store information, such as promotional messaging, associated with unique identifiers associated with each of the UWB beacon anchors. In response to receiving a query inclusive of a unique ID associated with a UWB beacon anchor from a portable device, the processing unit 302 may access the data repositories 312 to access information associated with the unique ID associated with the UWB beacon anchor, and communicate the information to the querying portable device. In one embodiment, the server may be positioned on a network, such as the Internet or on a local area network in the indoor environment.

In an embodiment, the server 300 may be positioned locally within the indoor environment, such as the server 114 of FIG. 1. In an aspect, the data repositories may also be configured to store "fingerprints" associated with the one or more UWB beacons in the indoor environment, and the software 304 may be configured to access the "fingerprints" stored in the data repository 312 to communicate the "fingerprints" to portable devices that enter the indoor location, such as a grocery or other retail store, for example. As described further herein, the portable devices may use the "fingerprints" to determine relative position, and optionally distance, with respect to the UWB beacon anchors in the indoor environment. It should be understood the information (e.g., messaging) and "fingerprints" may be stored and managed by the same or different data repositories and by the same or different servers locally or remotely positioned relative to the indoor environment.

Figure 4:
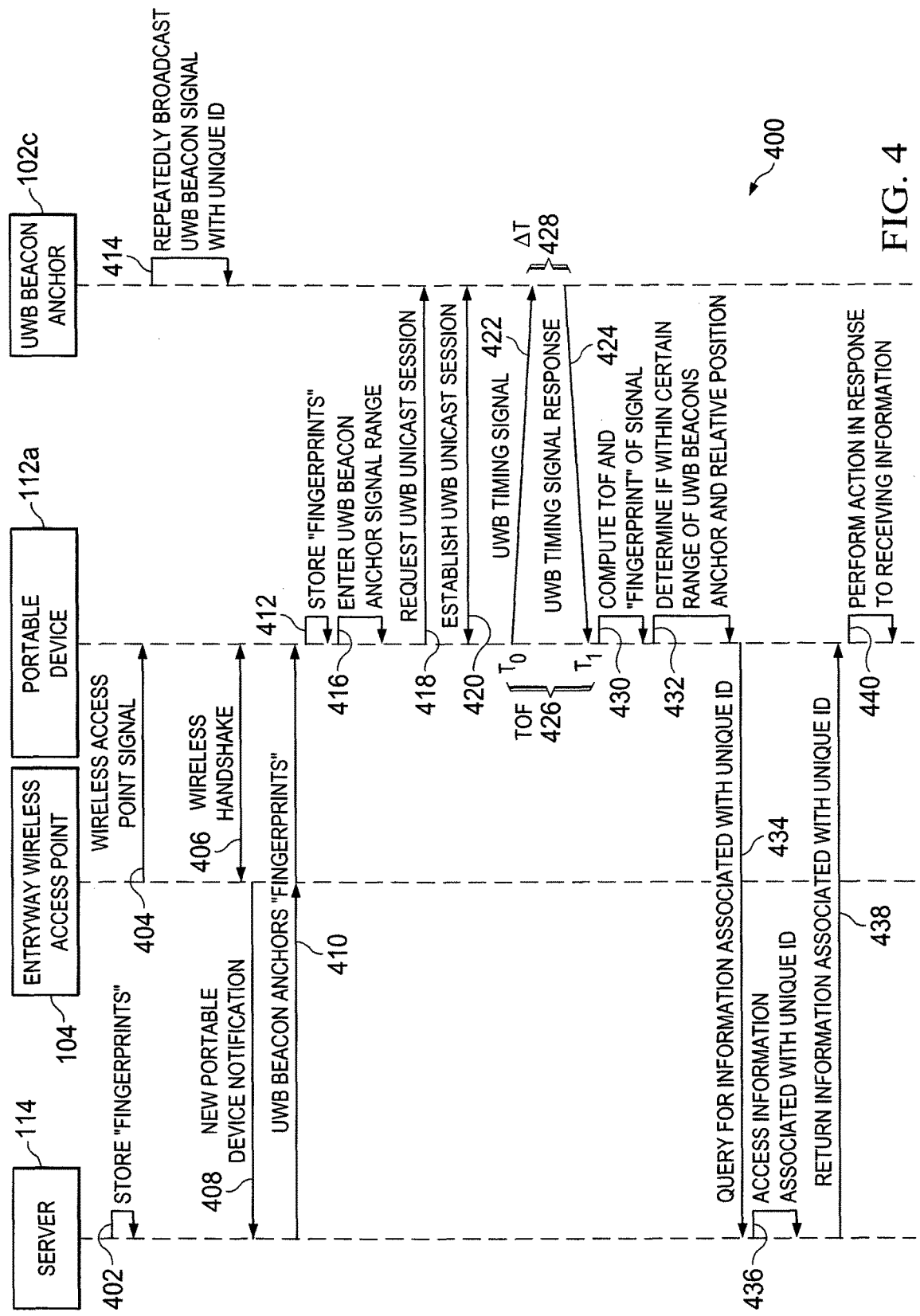
FIG. 4 is an interaction diagram inclusive of an illustrative process for supporting messaging within an indoor environment utilizing UWB beacon anchors.

With regard to FIG. 4, an interaction diagram inclusive of an illustrative process 400 for supporting messaging within an indoor environment utilizing UWB beacon anchors is shown. The interaction diagram is shown to include server 114, entryway wireless access point 104, portable device 112a, and UWB beacon anchor 102c that, when a user walks into the indoor environment, his or her portable device 112a may interact with these devices and systems for messaging to be presented to the user. It should be understood that the entryway wireless access point 104 and server 114 are optionally used to provide the "fingerprints" to the portable device 112a when entering the indoor environment.

The interactive process 400 starts at step 402, where UWB beacon "fingerprints" may be stored in a data repository being operated by the server 114. The UWB "fingerprints" may be collected by an operator by using a sensor, such as a portable device, to measure UWB signals at different points at different relative positions and, optionally, distances around the respective UWB beacon anchors in the indoor environment and stored in the data repository by the server 114.

At step 404, the entryway wireless access point 104 may communicate a wireless access point signal to the portable device 112a of the user. In response to the portable device 112a receiving the wireless access point signal, a wireless "handshake" may be performed between the portable device 112a and entryway wireless access point 104 to enable the portable device 112a to communicate with the entryway wireless access point 104 at step 406. It should be understood that the wireless access point 104 may be positioned anywhere so as to communicate with the portable device 112a outside and/or inside the indoor environment and that more than one wireless access points may be utilized. At step 408, the entryway wireless access point 104 may communicate a new portable device notification to the server 114 indicating that a new portable device has come within communication range of the wireless access point 104. The server 114 may identify and record an identifier associated with the portable device 112a from a received communications signal from the portable device so as to determine whether the "fingerprints" have previously been communicated to the portable device 112a or otherwise. At step 410, the server 114 may query a data repository, such as data repository 312a of FIG. 3, to access the "fingerprints" of UWB beacon anchors at the indoor environment and communicate "fingerprints" of UWB beacon anchors in the indoor environment to the portable device 112a so that the portable device 112a may store the "fingerprints" at step 412. The "fingerprints" may be used by the portable device 112a to determine relative position (e.g., front or back side) of a UWB beacon anchor with which the portable device 112a is positioned when in communication range of one of the UWB beacon anchors in the indoor environment.

At step 414, the UWB beacon anchor 102c may broadcast a UWB beacon signal inclusive of a repeating pulse may be with a unique ID associated with the UWB beacon anchor 102c. At step 416, the portable device 112a enters a signal range of the UWB beacon anchor 102c. At step 418, the portable device 112a, in response to determining that the portable device 112a is within the signal range of the UWB beacon anchor, communicates a request to the UWB beacon anchor 102c for a UWB unicast session. At step 420, the UWB beacon anchor 102c and the portable device 112a establish a UWB unicast session.

At step 422, the portable device 112a may communicate a UWB timing signal for use in determining distance between the portable device 112a and UWB beacon anchor 102c. At step 424, a UWB timing signal response may be made by the UWB beacon anchor 102c to the portable device 112a. Time-of-flight (TOF) 426 is defined by time between the UWB timing signal being sent by the portable device 112a at time $T_0$ and the UWB timing signal response being received from the UWB beacon anchor 102c at time $T_1$ by the portable device 112a. A latency time ($\Delta T$) 428 may be defined as the time that the UWB beacon anchor 102c takes to receive, process, and respond to the UWB timing signal, and may be used by the portable device 112a as an offset in determining distance between the portable device 112a and the. UWB beacon anchor 102c. In using the latency time 428, the portable device may have the latency time downloaded thereto (e.g., included in an application being executed by the portable device 112a) for improving accuracy in calculating distance between the portable device 112a and UWB beacon anchor 102c (e.g., $TOF=(T_1-T_0-\Delta T)*C$).

At step 430, the portable device 112a may compute time of flight and "fingerprint" of the UWB timing signal. Alternatively, the "fingerprint" may be computed from the UWB beacon signal previously received. At step 432, a determination as to whether the portable device 112a is within a certain range or distance of the UWB beacon anchor 102c along with relative position (e.g., front or back) with respect to the UWB beacon anchor 102c.

At step 434, the portable device 112a may communicate a query for information associated with the unique ID associated with the UWB beacon anchor 102c to the server. In one embodiment, the communication may be made via a local area network, such as a Wi-Fi® network, or via a mobile communications network and/or Internet. The server 114, in response to receiving the query, may access information associated with the unique ID in a data repository at step 436. At step 438, the information associated with the unique ID of the UWB beacon anchor 102c may be returned to the portable device 112a via a communications channel, and the portable device 112a may perform an action in response to receiving the information at step 440. In one embodiment, the action may include displaying the information in a graphical user interface (GUI) on an electronic display of the portable device. Other actions (e.g., tone or vibration generation) of which the portable device may be capable may also be performed, as understood in the art.

Figure 5:
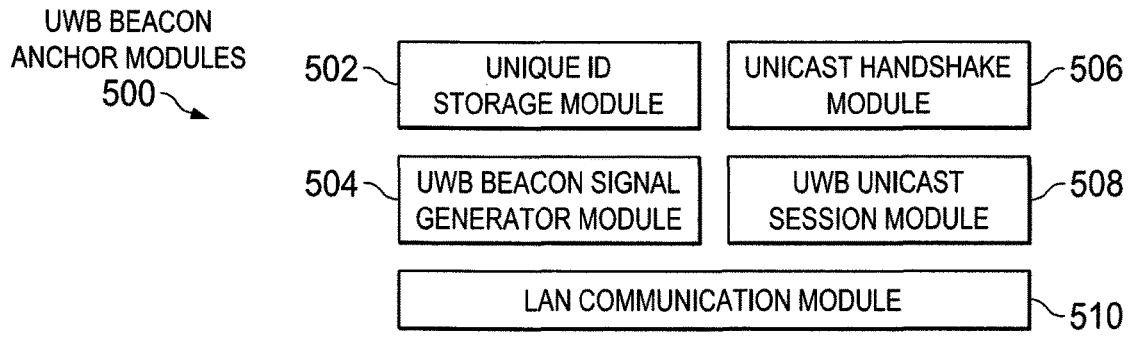
FIG. 5 is a block diagram of illustrative UWB beacon anchor modules for use in supporting messaging within an indoor environment.

With regard to FIG. 5, a block diagram of illustrative UWB beacon anchor modules 500 for use in supporting messaging to users of portable devices within an indoor environment is shown. The modules 500 may be executed by the UWB beacon anchor 200 of FIG. 2, and may include a unique ID storage module 502 that stores a unique ID of the UWB beacon anchor in a non-transient memory. The unique ID may include a universally unique identifier, major value, and minor value, as previously described. Other or additional information that operates as a unique ID for the UWB beacon anchor may be stored, as well. As previously described, the unique ID may be communicated in a UWB beacon signal.

UWB beacon signal generator module 504 may be configured to generate a UWB beacon signal. The module 504 may be software, hardware, or a combination thereof. As previously described, the UWB beacon signal generated by the module 504 may be a pulse sequence inclusive of the unique ID in a broadcast frame.

A unicast "handshake" module 506 may be configured to receive or request a unicast session as well as perform a communications "handshake" such that the UWB beacon anchor may communicate in a unicast manner with a portable device. The "handshake" may be performed using a standard communications protocol.

A UWB unicast session module 508 may be configured to perform a UWB unicast session with a portable device, where the unicast session may include receiving and responding to a UWB timing signal from the portable device. The UWB timing signal enables the portable device to determine the distance between the portable device and the UWB beacon anchor.

A local area network (LAN) communications module 510 may be configured to enable the UWB beacon anchor to communicate over a local area network with a local and/or remote server. The communications over the local area network may provide for remote configuration, upgrades, downloads of updated "fingerprints," or any other reasons.

Figure 6:
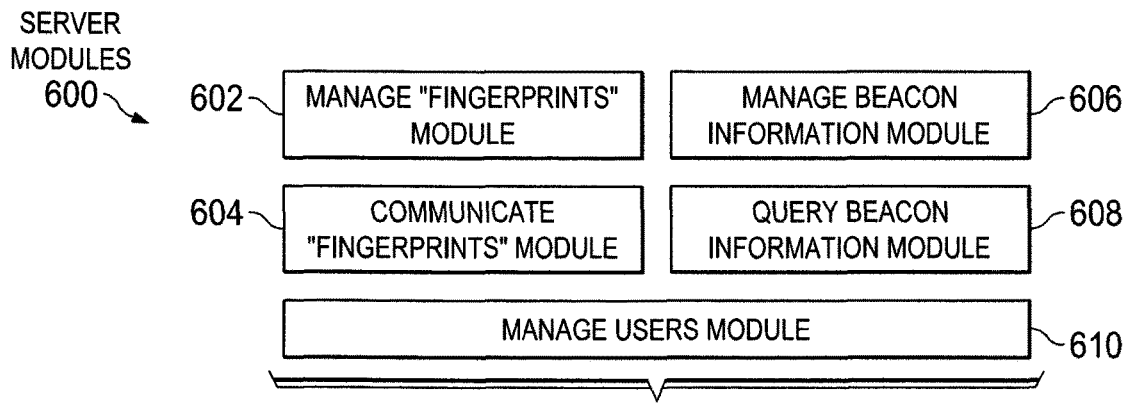
FIG. 6 is a block diagram of illustrative server modules for use in supporting messaging within an indoor environment.

With regard to FIG. 6, a block diagram of illustrative server modules 600 for use in supporting messaging to users of portable devices within an indoor environment is shown. The modules 600 may be executed by the server 300 of FIG. 3, and may include a manage "fingerprints" module that manages "fingerprints" associated with each UWB beacon anchor within the indoor environment. The "fingerprints" may be formed as sets of signal values measured around respective UWB beacon anchors, where the measurements may be sampled in both relative position (e.g., in front of and behind each of the respective UWB beacon anchors) and distance. In sampling the "fingerprints," an operator may make sample measurements at particular relative positions and distances circularly around (at least in front and back of) the respective UWB beacon anchors. For example, the sample measurements may be made every 15 degrees and every 3 feet around the UWB beacon anchors to form a map or set of "fingerprints" associated with each of the respective UWB beacon anchors. It should be understood that any number of defined measurement protocols may be used for establishing sets of measured "fingerprints." In one embodiment, the "fingerprints" may define two or more zones that define relative locations around the UWB beacon anchors. For example, two zones, one zone in front and one zone behind, the UWB beacon anchors. The operator may store the sampled "fingerprints" in a server for communication to portable devices of users when entering or otherwise being at the indoor environment for utilization by the portable devices when determining to query for information associated with a UWB beacon anchor, as described herein.

The "fingerprints" may include primary signals along with secondary peak or sidelobe signals that are indicative of "clutter" signals resulting from objects positioned near the UWB beacon anchors, as previously described. As understood in the art, the secondary peak signals at distinct frequencies from a main lobe of a signal, and are formed by nodes and antinodes resulting from reflections and other effects of signals in an indoor environment with objects near a UWB beacon anchor. The secondary peak signals are formed of real and imaginary parts of a signal that may be used to define a "fingerprint" (i.e., distinct or unique values) at each of the sample locations.

In managing the "fingerprints," the module 602 may store a unique identifier associated with each of the respective UWB beacon anchors in the indoor environment with which the "fingerprints" are associated. The server may download the "fingerprints" in response to a portable device accessing a wireless access point at an entryway of an indoor environment, for example.

A communicate "fingerprints" module 604 may be configured to communicate "fingerprints" and unique IDs of respective UWB beacon anchors via a communications network to a portable device. In communicating the "fingerprints," the module 604 may be configured to apply data associated with the "fingerprints" in a communications signal, such as a Wi-Fi® communication signal, for communication to a portable device via a wireless communications network and wireless access point.

A manage beacon information module 606 may be configured to manage information associated with UWB beacon anchors disposed within an indoor environment. The module 606 may be configured to store the information (e.g., messaging, coupon, advertisement, etc.) associated with unique IDs of respective UWB beacon anchors, thereby enabling the information to be queried with a unique ID by a portable device, and accessed by the server. In one embodiment, the information may be associated with one or more zones associated with each UWB beacon anchors. For example, a UWB beacon anchor may have multiple zones having different "fingerprints" defining each zone (e.g., a front zone and a back zone relative to a UWB beacon anchor), and each of the zones may have different information associated therewith. The module 606 may enable an operator to update information associated with the UWB beacon anchors. For example, if a sale special occurs for a product within a children's section, the operator may update the information to communicate the sale information to portable devices in proximity of the UWB beacon anchor at the children's section. The proximity may be determined by the portable device as established by an operator or provider of an application being executed by the portable device. For example, the proximity may be set at 15 feet.

A query beacon information module 608 may be configured to query the beacon information being managed by the module 606. The module 608 may be engaged in response to receiving a query from a portable device when the portable device determines that the portable device is within a certain proximity, such as 10 feet, of a UWB beacon anchor. Multiple messages associated with the same UWB beacon anchor may be stored and one or more messages may be communicated to the portable device each different time the portable device enters within the certain proximity of the respective UWB beacon anchor.

A manage users module 610 may be configured to manage information of users who query the server for information associated with UWB beacon anchors. The module 610 may be configured to receive an identifier associated with a user, such as a user ID or user name, that is entered into an application being executed by the portable device associated with the user, thereby enabling an operator to determine how often if the user engages the UWB beacon anchors and server, and whether the user acts upon messaging being communicated to the portable device of the user (e.g., purchases products associated with messages communicated to the portable devices). Rather than using a user ID or user name, an identifier associated with a portable device being used by the user may be utilized. In one embodiment, a hysteresis may be applied to the users such that repeat messages for a particular UWB beacon anchor are not sent to a user within a predetermined time period, such as 5 minutes, 30 minutes, 1 day, etc. In performing the hysteresis, a timer may be operated that counts down a predetermined time period, and that during the predetermined time period, the portable device may be prevented from querying for information associated with a UWB beacon anchor from which information has already been received.

Figure 7:
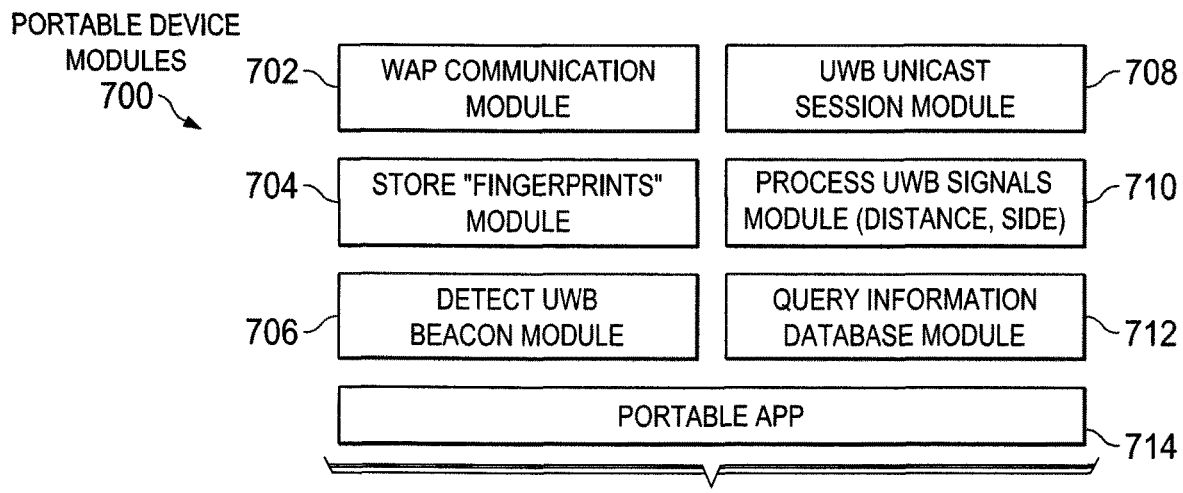
FIG. 7 is a block diagram of illustrative portable device modules for use by a portable device to receive messages within an indoor environment associated with UWB beacon anchors positioned therein.

With regard to FIG. 7, a block diagram of illustrative portable device modules 700 for use by a portable device to receive messages within an indoor environment associated with UWB beacon anchors positioned therein is shown. The modules 700 may be executed by a portable device, such as a mobile telephone, of a user. In one embodiment, the modules 700 may all be part of a portable app, partially part of the portable app, or independent of the portable app 714, as described hereinbelow.

The modules 700 may include a wireless access point (WAP) communications module 702 that is configured to enable the portable device to communicate with a wireless access point, such as a wireless access point disposed in a location that enables wireless communications at an entryway or other location at an indoor environment. The module 702 may be configured to communicate using one or more types of communications networks and protocols, such as WiFi® and Bluetooth® communications protocols.

A store "fingerprints" module 704 may be configured to receive and store "fingerprints" of UWB beacon anchors within an indoor environment in a non-transitory memory of the portable device. The module may store unique IDs associated with the UWB beacon anchors and the "fingerprints" in association with the unique IDs so as to be available for lookup during a location determination process, as described herein.

A detect UWB beacon module 706 may be configured to detect UWB beacon anchors from UWB beacon signals received by the portable device when entering a UWB beacon signal range of a UWB beacon. The module 706 may be configured to receive and identify a unique ID of the UWB beacon signal so that the portable device may be able to communicate the unique ID of the UWB beacon anchor to a server thereafter.

A UWB unicast session module 708 may be configured to request a UWB unicast session with a UWB beacon anchor that is detected by the module 706. In response to the UWB beacon anchor responding to the portable device, the module 708 may further be configured to perform a "handshake" to establish the UWB unicast session with the UWB beacon anchor. During the UWB unicast session, the portable device may generate or otherwise produce and communicate a UWB timing signal to the UWB beacon anchor, which, in turn, communicates the UWB timing signal (or another timing signal) back to the portable device so that the portable device may determine a time-of-flight, as further described hereinbelow.

A process UWB signals module 710 may be configured to process the UWB signals, including a UWB beacon signals and UWB unicast signals received during the UWB unicast session. The module 710 may be configured to (i) determine a time-of-flight of the UWB timing signal (i.e., from the time the UWB timing signal was transmitted to the time that the UWB timing signal was received by the portable device). The module 710 may compute a distance of the portable device from the UWB beacon anchor by multiplying the TOF by the speed of light (i.e., distance=TOF×C). Latency of the UWB beacon anchor may also be utilized in computing distance between the portable device and UWB beacon anchor, as previously described. In addition, the module 710 may process the received UWB signals from the UWB beacon anchor to determine secondary peaks or sidelobes that may be used to provide a "fingerprint" of the UWB beacon anchor as a result of "clutter" signals due to objects that are near the UWB beacon anchor. The module 710 may use the measured "clutter" signals or "fingerprints" to query a set of "fingerprints" to determine which side of a UWB beacon anchor that the portable device is located. In other words, the "fingerprints" of the UWB timing signals and/or UWB beacon signals are different when measured on the front side versus the back side (or potentially another relative angle) of the UWB beacon anchor.

A query information database module 712 may be configured to communicate a query signal inclusive of the unique ID of the UWB beacon anchor to a server via a communications network to request information (e.g., messaging, coupons, etc.). In one embodiment, the communications network is a local area network. Alternatively, the communications network may be a mobile communications network. The query signal may utilize a communications protocol of whatever communications network is utilized, as understood in the art. In response to the query, the module 712 may be configured to receive and store information associated with the UWB beacon anchor from the server, which may be local to the indoor environment or remote over a wide area communications network, such as the Internet.

A portable app 714 may be configured to provide a user interface and perform functionality for a user of the portable device. The portable app 714 may, for example, be configured to present the user with notices inclusive of information associated with each UWB beacon anchor in response to the module 712 receiving queried information associated with the unique ID of the UWB beacon anchor. The portable app 714 may include each of the modules 702-712 or be independent of the modules 702-712. One or more of the modules 702-712 may be standard modules, such as firmware, of the portable device and available for the portable app 714 or other modules to utilize in performing the functionality described herein.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A beacon anchor system, comprising:
   a server configured to:
   store a plurality of fingerprints associated with a plurality of respective beacon anchors, wherein each fingerprint including a main lobe and secondary peaks derived from measurements of an ultra-wide band (UWB) beacon signal in relative positions around the respective beacon anchor; and
   enable the fingerprints to be communicated to one or more portable devices to enable the respective portable devices to determine relative position from respective beacon anchors based on a main lobe and secondary peaks of measured fingerprints by the portable devices; and
   a plurality of beacon anchors, each beacon anchor comprising:
   a signal generator configured to generate an UWB beacon signal inclusive of a unique identifier associated with the beacon anchor, the UWB beacon signal being a pulse sequence;
   a transceiver in communication with the signal generator, and, responsive to receiving the UWB beacon signal from the signal generator, broadcast the UWB beacon signal; and
   a processor in communication with the signal generator and transceiver, and, responsive to receiving a unicast communications session request from a portable device via the transceiver, establish a unicast communications session with the portable device to enable a relative position between the portable device and beacon anchor to be determined by the portable device as a function of the measured fingerprint and stored fingerprints of the beacon anchors.

2. The beacon anchor system according to claim 1, wherein the transceiver includes a first circuit configured to broadcast the UWB beacon signal and a second circuit configured to communicate using a unicast communications session using UWB signals.

3. The beacon anchor system according to claim 2, wherein the second circuit is configured to receive and respond to a timing signal received from the portable device to enable the respective portable device to determine a distance from the respective beacon anchor based on a time of flight measurement for the timing signal and response.

4. The beacon anchor system according to claim 1, wherein the processor of the beacon is further configured to:
   access a non-transitory memory storing the plurality of fingerprints; and
   responsive to establishing the unicast communication session request from the portable device, communicate the plurality of fingerprints to the portable device.

5. The beacon anchor system according to claim 4, wherein the processor of the beacon anchor is further configured to:
   query the server for the plurality of stored fingerprints; and
   responsive to receiving the plurality of stored fingerprints, communicate the plurality of stored fingerprints to the portable device.

6. The beacon anchor system according to claim 1, wherein the portable device is one of a mobile telephone or a self-shopping tool.

7. The beacon anchor system according to claim 1, wherein the pulse sequence is periodically transmitted.

8. The beacon anchor system according to claim 1, wherein the processor of the beacon anchor, in performing the unicast communication session, is configured to respond to a UWB timing signal to enable the portable device to determine a distance from the respective beacon anchor based on a time-of-flight of a unicast communications signal inclusive of the UWB timing signal.

9. The beacon anchor system according to claim 1, further comprising:
a wireless access point in communication with the server; and
in response to the wireless access point completing a wireless handshake with the portable device, the server further being configured to communicate the fingerprints to the portable device.

10. The beacon anchor system according to claim 9, wherein the server, in communicating the stored fingerprints to the portable device, is further configured to communicate the stored fingerprints via the wireless access point to the portable device.

11. The beacon anchor system according to claim 1, wherein the server is further configured to transmit message information to the portable device responsive to a query with a unique ID and an associated zone for the UWB beacon anchor defined by one of the stored fingerprints.

12. The beacon anchor system according to claim 11, wherein the message information includes at least one of a coupon or an advertisement.

13. The beacon anchor system according to claim 1, wherein the secondary peaks are sidelobes at distinct frequencies relative to the main lobe.

14. The beacon anchor system according to claim 1, wherein the secondary peaks are indicative of clutter signals resulting from objects positioned near the UWB beacon anchors.

15. A beacon anchor system, comprising:
a portable device;
a beacon anchor configured to:
generate and broadcast an ultra-wide band (UWB) beacon signal inclusive of a unique identifier associated with the beacon anchor; and
a server configured to:
store a fingerprint associated with the beacon anchor, wherein the fingerprint includes a main lobe and secondary peaks derived from measurements of the UWB beacon signal in at least two sample locations around the beacon anchor; and
communicate the stored fingerprint to the portable device;
wherein the portable device is configured to:
establish a unicast communications session request with the beacon anchor;
determine a measured fingerprint from the beacon anchor based on a main lobe and secondary peaks of a signal measured by the portable device; and
determine a relative position of the portable device with the beacon anchor as a function of the measured fingerprint and stored fingerprint of the beacon anchor.

16. The beacon anchor system according to claim 15, wherein the portable device is further configured to determine a distance between the portable device and the beacon anchor based on a UWB timing signal received during the unicast communications session.

17. The beacon anchor system according to claim 15, wherein the portable device is configured to determine the measured fingerprint from the beacon anchor based on a main lobe and secondary peaks of the UWB timing signal.

18. The beacon anchor system according to claim 15, wherein the portable device is configured to determine the measured fingerprint from the beacon anchor based on a main lobe and secondary peaks of the UWB beacon signal previously received prior to establishing the unicast communications session.

19. The beacon anchor system according to claim 15, wherein the sampled locations define different zones for the same beacon anchor associated with different information to be presented to the user by the portable device.

* * * * *